United States Patent
Thoms et al.

(10) Patent No.: US 6,658,719 B2
(45) Date of Patent: Dec. 9, 2003

(54) EQUIPMENT FOR STRIPPING A TWISTED MULTI-CORE CABLE

(75) Inventors: Karin Thoms, Stans (CH); Urs Mehri, Stans (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 10/074,320

(22) Filed: Feb. 12, 2002

(65) Prior Publication Data

US 2003/0150097 A1 Aug. 14, 2003

(30) Foreign Application Priority Data

Feb. 13, 2001 (EP) ............................................. 01810146

(51) Int. Cl.$^7$ ................................................ B23P 23/00
(52) U.S. Cl. .................... 29/564.4; 29/564.1; 29/564.3; 81/9.51; 140/149
(58) Field of Search ............................ 29/564.1, 564.3, 29/564.4; 81/9.51; 140/149

(56) References Cited

U.S. PATENT DOCUMENTS

| | | | |
|---|---|---|---|
| 3,003,375 A | 10/1961 | Hopkins | |
| 3,779,290 A | * 12/1973 | Rich et al. | 140/149 |
| 3,815,449 A | * 6/1974 | Folkenroth et al. | 140/149 |
| 3,853,156 A | * 12/1974 | Folkenroth et al. | 140/149 |
| 3,994,188 A | * 11/1976 | Baba et al. | 81/9.51 |
| 4,194,281 A | * 3/1980 | Gudmestad | 29/867 |
| 4,283,971 A | 8/1981 | Hetmanski | |
| 5,072,632 A | * 12/1991 | Sayyadi | 81/9.51 |
| 5,465,637 A | * 11/1995 | Konen et al. | 81/9.51 |
| 5,867,896 A | * 2/1999 | Watanabe | 29/828 |
| 6,164,163 A | * 12/2000 | Lesueur et al. | 81/9.51 |

FOREIGN PATENT DOCUMENTS

| | | |
|---|---|---|
| FR | 2167417 | 8/1973 |
| WO | 99.52188 | 10/1999 |

* cited by examiner

Primary Examiner—A. L. Wellington
Assistant Examiner—Dana Ross
(74) Attorney, Agent, or Firm—Schweitzer Cornman Gross & Bondell LLP

(57) ABSTRACT

Equipment for stripping a multi-core cable, includes a transport unit for axial movement of the cable, knives for desheathing and stripping the insulation from the cores, and a separator for untwisting the cores and orienting them parallel for acting upon by the stripping knife in a manner that axial forces are not applied to the insulator of the cores. Greater control over and precision associated with the stripping process is obtained.

7 Claims, 3 Drawing Sheets

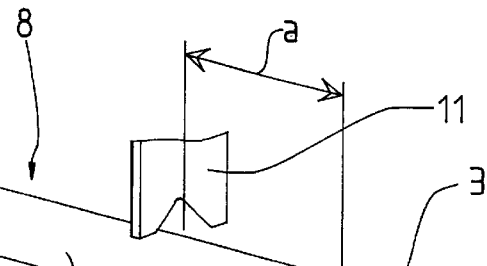
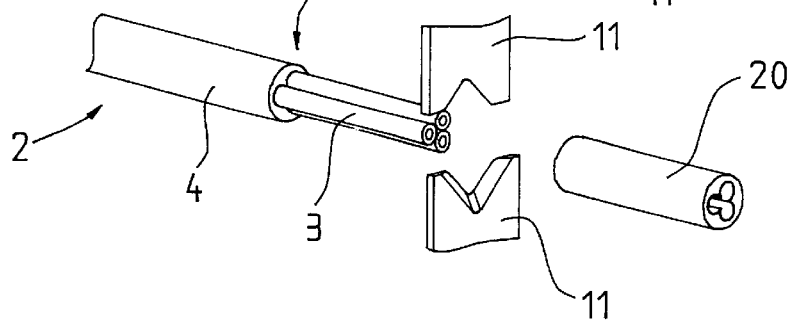
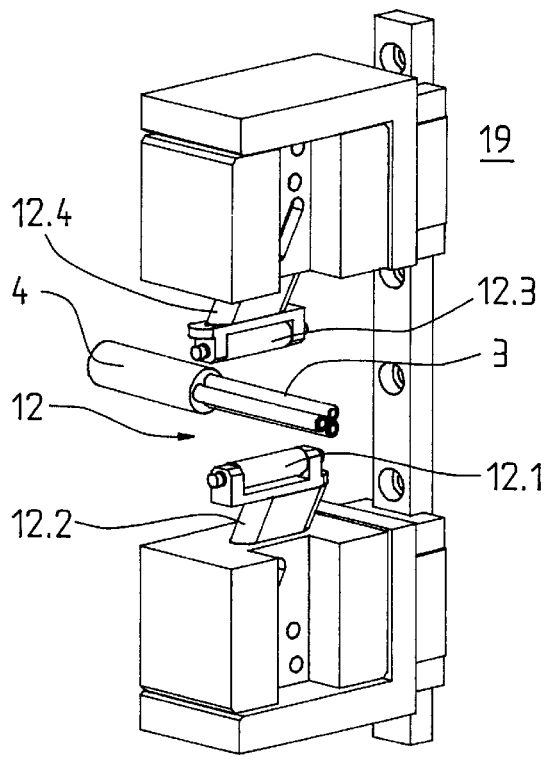
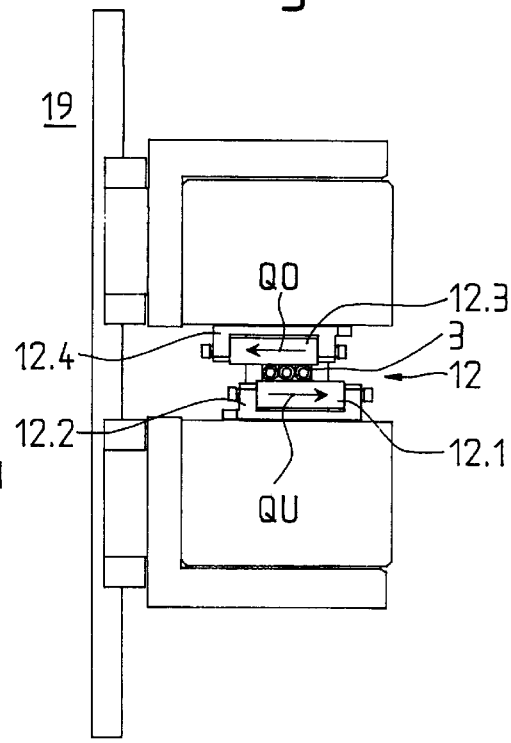

EQUIPMENT FOR STRIPPING A TWISTED MULTI-CORE CABLE

The invention relates to equipment for stripping a multi-core cable, wherein a transport unit for transport of the cable in the axial direction of the cable, a knife for desheathing the cable and a further knife for stripping the untwisted cable cores are provided.

BACKGROUND OF THE INVENTION

A stripping device for multi-core cables has become known from the disclosure of WO99/52188. Cable cores are mechanically untwisted by a stripping movement and oriented parallel to one another before the cable cores are stripped by means of multiple knives. The stripping movement and the parallel orientation are achieved by means of spring-loaded, mutually opposed jaws, wherein the jaws act as resilient slide members. The cable cores execute a movement relative to the slide members whereby the untwisted cable cores are separated and oriented to be parallel before the stripping.

A disadvantage of the known equipment resides in the fact that, due to the stripping movement, forces act in the cable's axial direction on the insulation of the cable cores which slightly stretch the insulation. After the stripping, the insulation can compress again, resulting in overly-large, material-dependent stripped lengths.

BRIEF DESCRIPTION OF THE INVENTION

The present invention avoids the disadvantages of known equipment and presents a construction by means of which the cable cores of a cable can be untwisted and oriented in problem-free manner.

The advantages achieved by the invention are essentially to be seen in the fact that the resilient insulation is not stretched during untwisting of the cable cores. The stripped length of the cable cores does not change after the untwisting. The stripped length of the cable cores as predetermined by the stripping is maintained. Moreover, shorter desheathed lengths can be realised, because the insulation is not stretched.

The invention includes a transport unit for axial transport of the cable, a knife for desheathing the cable, means for untwisting the cores and orienting the cores parallel to each other, and a knife for stripping the cores. The cores are untwisted and oriented parallel without the application of an axial force to their installation. The untwisting and orientation may be performed by a separator which may include rollers, engage the cores and act transversely to the axial direction of the cable.

BRIEF DESCRIPTION OF THE FIGURES

The present invention is explained in more detail on the basis of the accompanying figures, in which:

FIG. 2 is a view of a first portion of a desheathing step;

FIG. 3 is a view of a second portion of a desheathing step;

FIG. 4 is a perspective view of a separator of the invention in an open setting for the untwisting of the cable cores;

FIG. 5 is a view of the separator in a closed setting;

DETAILED DESCRIPTION OF THE INVENTION

Figure 1:
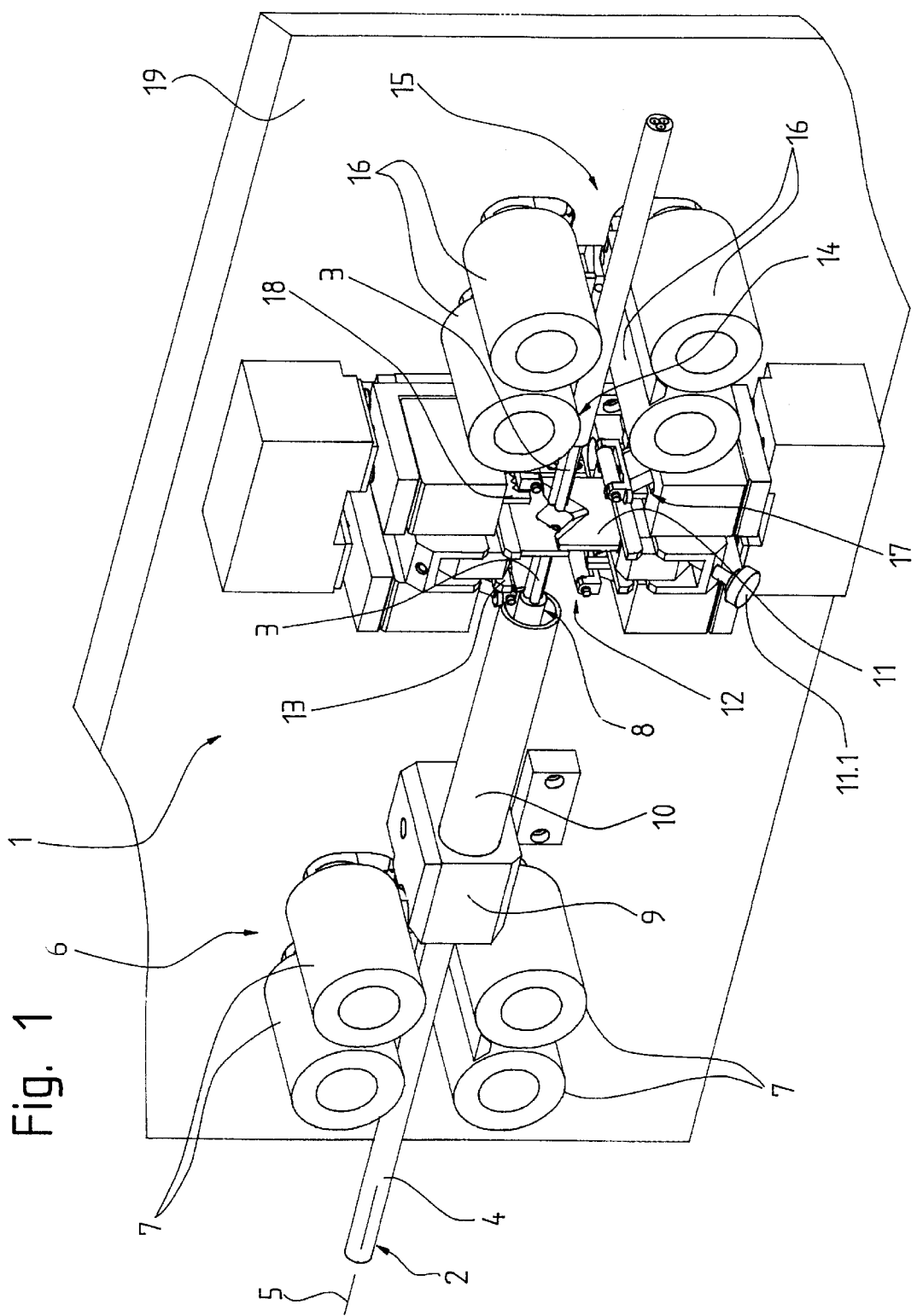
FIG. 1 is a perspective view of the invention.

FIG. 1 shows stripping equipment 1 of the invention for the stripping of a cable 2 with several cable cores 3. The cable cores are typically twisted and sheathed by a cable sheath 4. A main axial cable direction is denoted by 5.

The cable 2 can be advanced and drawn back through the equipment by means of a first transport unit 6, wherein upper and lower drivable roller pairs 7 produce the movement of the cable 2. The cable forward end or start 8 is advanced through a guide tube 10, which is pivotable by means of a pivot mechanism 9, to a separating knife 11, wherein the separating knife 11 is provided for cutting through the cable 2 and for desheathing the cable 2. A setscrew 11.1 enables a quick exchange of a knife block having the separating knife 11. Arranged between the end of the guide tube 10 and the separating knife 11 is a first separator 12 for untwisting the cable cores 3, and a first profiled knife 13 for stripping the cable cores 3.

For processing the opposed severed cable end 14, the corresponding length of cable 2 can be advanced and drawn back by means of a second transport unit 15, wherein upper and lower drivable roller pairs 16 produce the movement of the cable 2. Arranged between the transport unit 15 and the separating knife 11 is a second separator 17 for untwisting the cable cores 3 and a second profiled knife 18 for stripping the cable cores 3. The separating knife 11 and the profiled knives 13, 18 each comprise a pair of upper and lower knives.

The transport units 6 and 15, the pivot mechanism 9, the knives 11, 13, 18 and the separators 12 and 17 are arranged at a mount 19.

FIG. 2 shows the forward end 8 of the cable 8 after severing of the cable by the separating knife 11. The opposed severed cable end 14 is not illustrated. For the desheathing, the cable 2 is advanced the desired desheathing length "a" by means of the first transport unit 6. Thereafter, the separating knife 11, consisting of two halves, is advanced so that the cable sheathing 4 is cut into. The first transport unit 6 then draws the cable 2 back, wherein, as shown in FIG. 3, a sheath residue 20 is pushed off by the separating knife. The cable cores 3 are now free, but still twisted. The processing of the opposed cable end 14 takes place analogously to the processing of the cable end 8.

FIG. 4 shows the first separator 12 (without first profiled knife 13) in the open setting. The separator 12 consists of a lower, freely rotatable roller 12.1, which is supported by a lower roller mount 12.2, and an upper, freely rotatable roller 12.3, which is supported by an upper roller mount 12.4. The roller mounts 12.2, 12,4 are driven in a spring-loaded manner in the vertical direction.

FIG. 5 shows the first separator 12 in the closed setting. The roller mounts 12.2, 12,4 are driven in the vertical direction towards each other and against the cable. Upon the advance of the first separator 12 the cable 2 is so positioned in the cable's axial direction that the cable core 3 near to the cable sheath end lies between the lower roller 12.1 and the upper roller 12.3, at which time the lower roller 12.1 executes a movement QU transversely to the cable axis 5, for example away from the mount 19, while the upper roller 12.3 simultaneously executes a movement QO oppositely transverse to the cable axis 5, for example in the direction of the mount 19. After the transverse movements QU, QO of the rollers 12.1, 12.3, the separator 12 is opened and the cable 2 drawn back, for example by a third of the free cable core length, and the transverse movements QU, QO are applied again to the cable cores 3. The preceding step can be repeated as required by the respective twisting, in that the separator 12 is opened and the cable is drawn back by a further third and the transverse movements QU, QO are applied again to the cable cores 3. Strongly twisted cable cores can be untwisted by further stepwise application of the transverse movements QU, QO or forces to the cable cores 3. In the case of weaker twisting, a single application of the transverse movements QU, QO may be sufficient for the untwisting and parallel orientation of the cable cores 3. The untwisting can also be carried out, without cable transport, merely by multiple dosing and opening of the separator 12.

Figure 7:
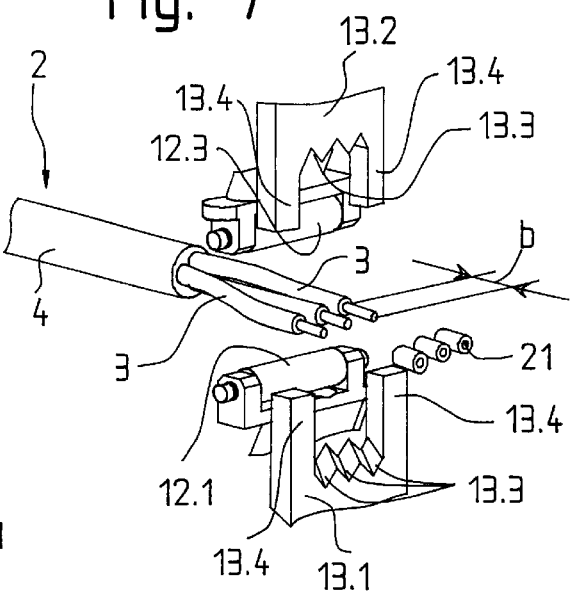
FIG. 7 is a detail view of the separator with the profiled knife in an open setting.

After untwisting, the cable may be axially repositioned in the separator as required to allow the desired length of the cable cores to be stripped. FIG. 5 and FIG. 7 show the parallel orienting of the cable cores 3. Due to the freely rotatable rollers 12.1, 12.3, virtually no forces act in the cable axial direction on the insulation of the cable cores 3 during subsequent stripping of the cable cores 3. After the stripping of the cable cores 3, the stripped length is maintained.

Figure 6:
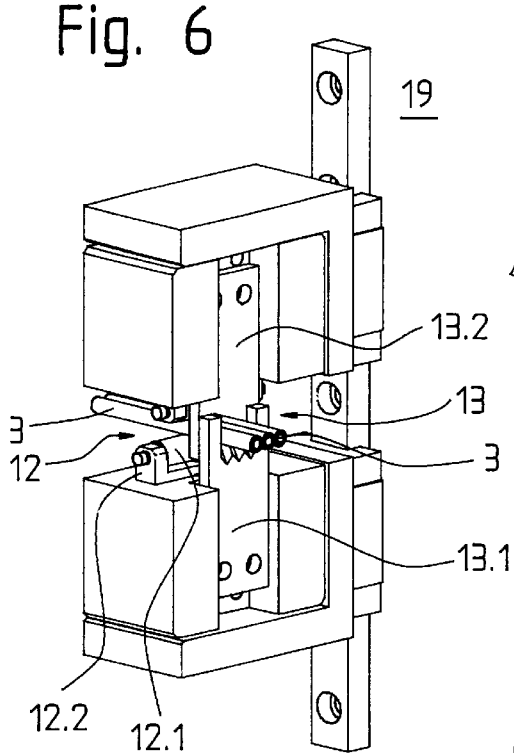
FIG. 6 is a view of the separator in a closed setting with a profiled knife.

FIG. 6 shows the separator 12 in the closed setting with the profiled knife 13 cutting into the core insulation. The profiled knife 13 comprises a lower knife 13.1 and an upper knife 13.2, wherein the knives 13.1, 13.2 have a number of cutting profiles 13.3, which correspond to the number of cable cores 3. Opposed limbs 13.4 arranged laterally of the cutting profiles 13.3 limit the transverse movement of the cable cores 3 during the untwisting before the profiled knife is activated. After cutting into the core insulation the cable 2 is drawn back by means of the first transport unit 6 and, as shown in FIG. 7, the separator 12 together with the profiled knife 13 is opened. The predetermined stripped length is denoted by b and the insulation residues are denoted by 21.

The separators 12, 17 can be driven with the associated profiled knife 13, 18 or can have their own drive.

The untwisting, the orienting to be parallel and the stripping of the cable cores 3 of the cable end 14 is carried out analogously to the processing of the cable end 8.

Figure 8:
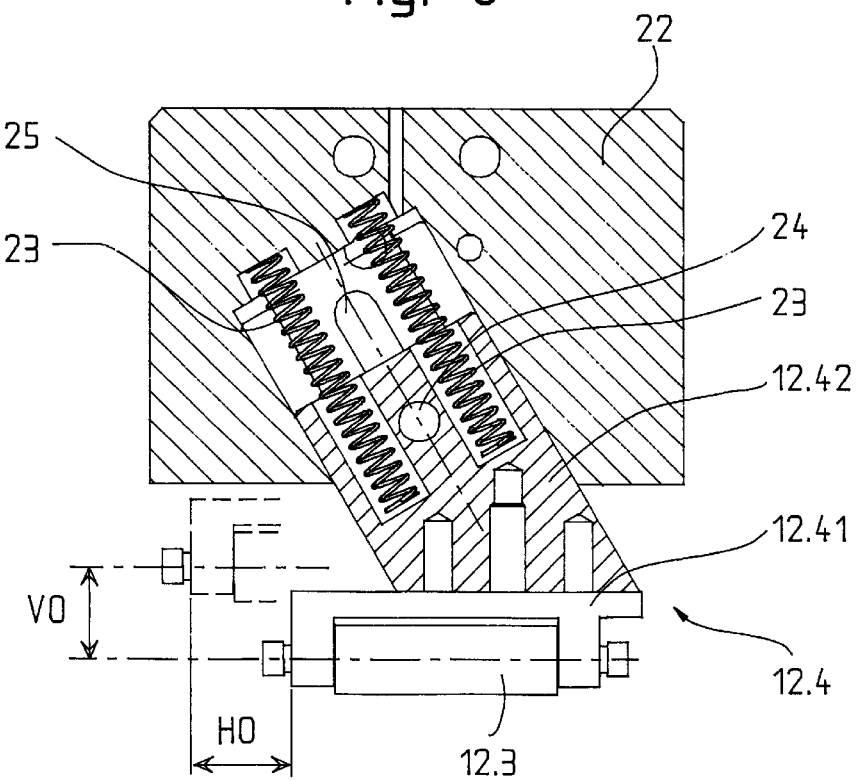
FIG. 8 is a sectional detail view of the separator.

FIG. 8 shows details of the upper roller mount 12.4 of the separator 12. The roller mount 12.4 consists of a roller support 12.41 supporting the upper roller 12.3 and a slide member 12.42, which slide member 12.42 is displaceably arranged in a housing 22. The slide member 12.42 is loaded by means of a spring force emanating from compression springs 23. A pin 24 of the slide member 12.42 engages in an elongate slot 25 of the housing 22, wherein the pin 22 and thus the roller mount 12.4 and roller 12.3 is limited in terms of travel by the ends of the elongate slot 25.

In FIG. 8 the roller mount 12.4 is shown driven out in the vertical direction by a solid line and driven inwardly in the vertical direction, by a dashed line. The maximum possible stroke of the roller 12.3 is denoted by VO. Due to the inclined arrangement of the slide member 12.42, the roller 12.3 also executes a movement in the horizontal direction. The maximum possible movement in the horizontal direction is denoted by HO. As explained further above, the movement in the horizontal direction serves for untwisting the cable cores 3.

The function and mode of construction of the lower roller mount 12.2 are analogous to that of the upper roller mount 12.4.

We claim:

1. Equipment for stripping a twisted multi-core cable, comprising a transport unit for transport of the cable in the axial direction of the cable; a knife for desheathing the cable and a knife for stripping insulation from cable cores of the cable; and means for untwisting and orienting the cable cores parallel to each other without forces acting in a cable axial direction on the insulation of the cable cores for acting upon by said knife for stripping, said means comprising upper and lower freely rotatable rollers for engaging and contacting the cable cores.

2. The equipment of claim 1, wherein the upper and lower rollers are oriented to apply forces to the cable cores transversely to a cable axial direction.

3. The equipment of claim 1, wherein the separator further comprises a lower roller mount supporting the lower freely rotatable roller and an upper roller mount supporting the upper freely rotatable roller, the lower and upper roller mounts being respectively mounted to apply transverse forces to the cable cores in opposite senses.

4. The equipment of claim 3, wherein the lower and upper roller mounts include inclined spring-loaded slide members.

5. A method for stripping an insulated multi-core cable having a cable sheath and twisted cable cores with insulation which can be advanced and drawn back in a cable axial direction by means of a transport unit, wherein one knife removes the cable sheath and a further knife removes the insulation of the cable cores, comprising the step of performing an untwisting of the cable cores by upper and lower freely rotatable rollers engaging and contacting the cable cores without forces acting on the insulation of the cable cores in the cable axial direction.

6. The method according to claim 5, wherein the untwisting of the cable cores step is performed by the application of forces to the cable cores by the upper and lower rollers acting transversely to the cable axial direction.

7. The method according to claim 6, characterized in that the forces are applied in a stepwise manner to the cable cores.

* * * * *